US012669103B2

(12) United States Patent
Okamoto et al.

(10) Patent No.: US 12,669,103 B2
(45) Date of Patent: Jun. 30, 2026

(54) SUPPORT STRUCTURE FOR FUEL INJECTION VALVE

(71) Applicant: HITACHI ASTEMO, LTD., Hitachinaka (JP)

(72) Inventors: Atsushi Okamoto, Hitachinaka (JP); Takaya Fukunaga, Hitachinaka (JP); Kazuki Noda, Hitachinaka (JP); Takumi Suzuki, Hitachinaka (JP)

(73) Assignee: Hitachi Astemo Ltd., Ibaraki (JP)

( * ) Notice: Subject to any disclaimer, the term of this patent is extended or adjusted under 35 U.S.C. 154(b) by 228 days.

(21) Appl. No.: 18/291,352

(22) PCT Filed: Oct. 17, 2022

(86) PCT No.: PCT/JP2022/038575

§ 371 (c)(1),
(2) Date: Jan. 23, 2024

(87) PCT Pub. No.: WO2023/068222

PCT Pub. Date: Apr. 27, 2023

(65) Prior Publication Data

US 2024/0209819 A1 Jun. 27, 2024

(30) Foreign Application Priority Data

Oct. 19, 2021 (JP) ................................ 2021-171223

(51) Int. Cl.
*F02M 61/14* (2006.01)
*F02M 51/06* (2006.01)

(52) U.S. Cl.
CPC .......... *F02M 61/14* (2013.01); *F02M 51/061* (2013.01)

(58) Field of Classification Search
CPC ............................ F02M 61/14; F02M 51/061
See application file for complete search history.

(56) References Cited

U.S. PATENT DOCUMENTS 4,993,390 A * 2/1991 Ono .................... F02M 69/044 123/456
5,685,191 A * 11/1997 Kawano ............... B21D 5/0236 72/482.91
5,724,946 A * 3/1998 Franchitto ............ F02M 69/465 123/468

(Continued)

FOREIGN PATENT DOCUMENTS

JP H08-33922 A 2/1996
JP 2002-516957 A 6/2002

(Continued)

*Primary Examiner* — Joseph A Greenlund
(74) *Attorney, Agent, or Firm* — Carrier, Shende & Associates P.C.; Joseph P. Carrier; Fulchand P. Shende

(57) ABSTRACT

In a support structure for a fuel injection valve (I), a snap protrusion (21) snap-engaged with an outer peripheral surface of a fuel introduction cylinder part (4) accepted in a notch (19) is formed on an inner side surface of the notch (19) of the base plate (15). A snap engagement force of the snap protrusion (21) with respect to the fuel introduction cylinder part (4) automatically increases because of an increase in a contact frictional force of the elastic piece (16) against the base plate (15) caused by an increase in a flexural repulsive force of the elastic piece (16), in a mounted state of the fuel injection valve (I) on the engine (E).

4 Claims, 4 Drawing Sheets

(56) References Cited

U.S. PATENT DOCUMENTS

| | | | | |
|---|---|---|---|---|
| 5,820,168 | A * | 10/1998 | De Giacomoni | F16L 3/10 285/330 |
| 6,053,149 | A * | 4/2000 | Lorraine | F02M 69/465 123/456 |
| 6,481,420 | B2 * | 11/2002 | Panasuk | F02M 55/004 123/470 |
| 6,668,803 | B1 * | 12/2003 | McClean | F02M 61/14 123/456 |
| 6,830,037 | B1 * | 12/2004 | Braun | F02M 63/0225 123/470 |
| 7,802,559 | B2 * | 9/2010 | Furst | F02M 61/14 123/470 |
| 8,701,632 | B2 * | 4/2014 | Solferino | F02M 55/02 123/470 |
| 9,032,934 | B2 * | 5/2015 | Nakamura | F02M 61/14 123/456 |
| 9,506,438 | B2 * | 11/2016 | Inomata | F02M 61/12 |
| 9,938,948 | B2 * | 4/2018 | Serra | F02M 61/145 |
| 10,718,303 | B2 * | 7/2020 | Oh | F02M 61/168 |
| 11,459,989 | B2 * | 10/2022 | Oh | F16B 2/22 |
| 12,305,600 | B2 * | 5/2025 | Tanaka | F02M 55/02 |
| 2009/0056674 | A1 * | 3/2009 | Furst | F02M 61/14 123/470 |
| 2013/0220276 | A1 * | 8/2013 | Nakamura | F02M 61/14 123/470 |
| 2017/0218908 | A1 * | 8/2017 | Maeda | F02M 51/005 |
| 2024/0209819 | A1 * | 6/2024 | Okamoto | F02M 51/061 |

FOREIGN PATENT DOCUMENTS

| | | | |
|---|---|---|---|
| JP | 2008-514861 | A | 5/2008 |
| JP | 2010-168965 | A | 8/2010 |
| JP | 2011-091460 | A | 5/2011 |
| JP | 2013-174227 | A | 9/2013 |

* cited by examiner

SUPPORT STRUCTURE FOR FUEL INJECTION VALVE

TECHNICAL FIELD

The present invention relates to a support structure for a fuel injection valve used in an engine, and particularly, to an improvement in a support structure for a fuel injection valve in which a fuel nozzle cylinder part of a valve housing is fitted into an injection valve mounting hole of the engine, a fuel supply cap of a fuel distribution pipe supported by the engine is fitted onto a fuel introduction cylinder part of the valve housing, and an elastic support member that biases the valve housing toward the injection valve mounting hole is interposed between the valve housing and the fuel supply cap, thereby resiliently sandwiching the fuel injection valve between the engine and the fuel supply cap to prevent an axial movement thereof.

BACKGROUND ART

Such a support structure for a fuel injection valve is already known as disclosed in Patent Literature 1 below.

CITATION LIST

Patent Literatures

Patent Literature 1: Japanese Patent Application Laid-Open No. 2013-174227
Patent Literature 2: PCT Patent Publication Laid-Open No. 2002-516957

SUMMARY OF INVENTION

Technical Problem

After the fuel injection valve is produced, the elastic support member is attached to a predetermined position of the fuel injection valve in advance when the produced fuel injection valve is transported to an assembly line of the engine, but it is necessary to ensure that the elastic support member does not fall off or shift from the fuel injection valve during the transportation. In order to prevent the falling-off or the shift, in the support structure for the fuel injection valve disclosed in Patent Literature 1, a pair of sandwiching pieces extending in a bent manner from one end of a base plate of the elastic support member toward a fuel nozzle cylinder part side are consecutively provided on the base plate, and these sandwiching pieces resiliently sandwich flat both side surfaces of the valve housing. In this support structure, although the elastic support member can be easily attached to the fuel injection valve, consecutively providing the pair of sandwiching pieces on the base plate complicates the structure of the elastic support member, increases processing steps, and lowers the yield of the material, which leads to a drawback of increased cost in the support structure.

Meanwhile, in a support structure for a fuel injection valve described in Patent Literature 2, the clastic support member is attached to the fuel injection valve by a snap engagement structure, but in a case where an engagement force of the snap engagement structure is sufficiently strengthened, attachability deteriorates. In response to this, in a case where the engagement force is set to be weak in consideration of the attachability, there is a concern that the elastic support member may be detached from the fuel injection valve because of the vibration of the engine in a mounted state of the fuel injection valve on the engine.

The present invention has been made in view of such circumstances, and an object thereof is to provide a support structure for a fuel injection valve in which a snap engagement structure is adopted in order to ensure good attachability of an elastic support member to a fuel injection valve while simplifying a structure of the elastic support member, and in a mounted state of the fuel injection valve on the engine, a snap engagement force is automatically strengthened to prevent the elastic support member from being detached from the fuel injection valve.

Solution to Problem

A first feature of the present invention is that a support structure for a fuel injection valve in which a fuel nozzle cylinder part of the valve housing is fitted into an injection valve mounting hole of an engine, a fuel supply cap of a fuel distribution pipe supported by the engine is fitted onto a fuel introduction cylinder part of the valve housing, an elastic support member configured to bias the valve housing toward the injection valve mounting hole is interposed between the valve housing and the fuel supply cap to form the support structure, and the elastic support member includes a base plate having a U-shaped notch configured to accept an outer periphery of the fuel introduction cylinder part, and overlaid on a base surface facing the fuel supply cap and provided on the valve housing, and an elastic piece extending from one end of the base plate, and configured to bring an intermediate part into resilient contact with the fuel supply cap and bring a tip part into resilient contact with the base plate, and a snap protrusion snap-engaged with an outer peripheral surface of the fuel introduction cylinder part accepted in the notch is formed on an inner side surface of the notch, and a snap engagement force of the snap protrusion with respect to the fuel introduction cylinder part increases because of an increase in a contact frictional force of the elastic piece against the base plate caused by an increase in a flexural repulsive force of the elastic piece, in a mounted state of a fuel injection valve on the engine.

Additionally, in addition to the first feature, a second feature of the present invention is that a first notch is provided in intermediate parts of both outer side surfaces of the base plate.

Furthermore, in addition to the first or second feature, a third feature of the present invention is that a second notch adjacent to a root of the elastic piece is provided in the base plate.

According to the first feature of the present invention, in adopting a snap engagement structure, the increase in the contact frictional force of the elastic piece against the base plate due to the flexural repulsive force of the elastic piece results in an increase in opening resistance of the notch in the base plate in the mounted state of the fuel injection valve on the engine even in a case where an engagement force of the snap engagement structure is set to prioritize the attachability of the elastic support member to the fuel injection valve. Therefore, detachment resistance of the snap protrusion from the fuel introduction cylinder part increases, whereby it is possible to prevent the elastic support member from falling off from the fuel injection valve. Moreover, the adoption of the snap engagement structure achieves simplification of the structure of the elastic support member, and cost reduction can be achieved.

According to the second feature of the present invention, by providing the first notch in the intermediate parts of the base plate on both outer sides, it is possible to decrease the spring constant of the base plate without changing the contact area of the elastic piece tip part on the base plate and without changing the height of the snap protrusion, whereby the snap engagement force can be reduced and adjusted to improve the attachability of the elastic support member to the fuel injection valve.

According to the third feature of the present invention, by providing the second notch adjacent to the root of the elastic piece on the base plate, in the same manner as described above, it is possible to decrease the spring constant of the base plate without changing the contact area of the elastic piece tip part on the base plate and without changing the height of the snap protrusion, whereby the snap engagement force can be reduced and adjusted to improve the attachability of the elastic support member to the fuel injection valve.

DESCRIPTION OF EMBODIMENTS

An embodiment of the present invention will be described with reference to the drawings.

Figure 1:
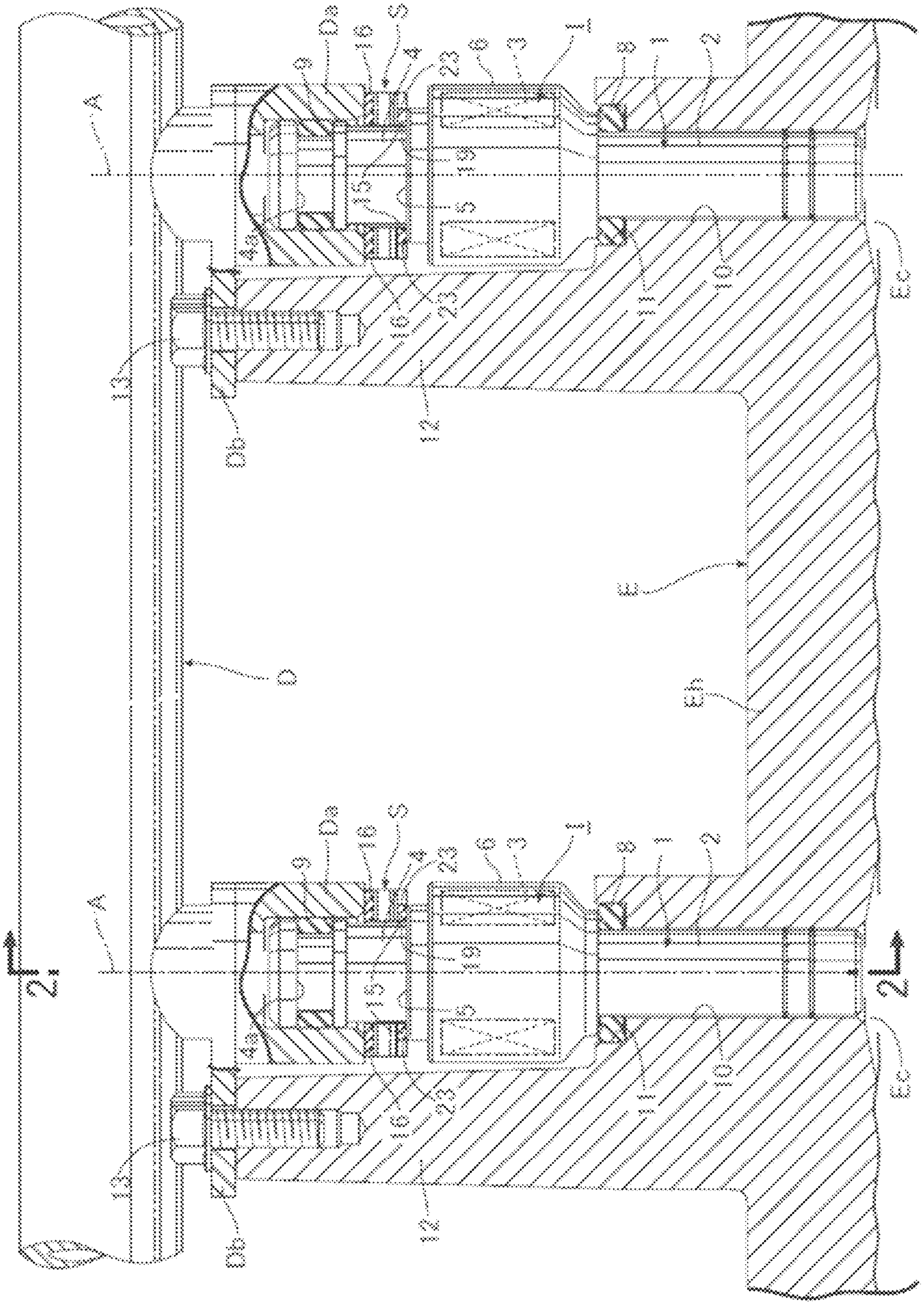
FIG. 1 is a partial longitudinal sectional front view illustrating a support structure for a fuel injection valve in a multi-cylinder engine according to an embodiment of the present invention.
Figure 2:
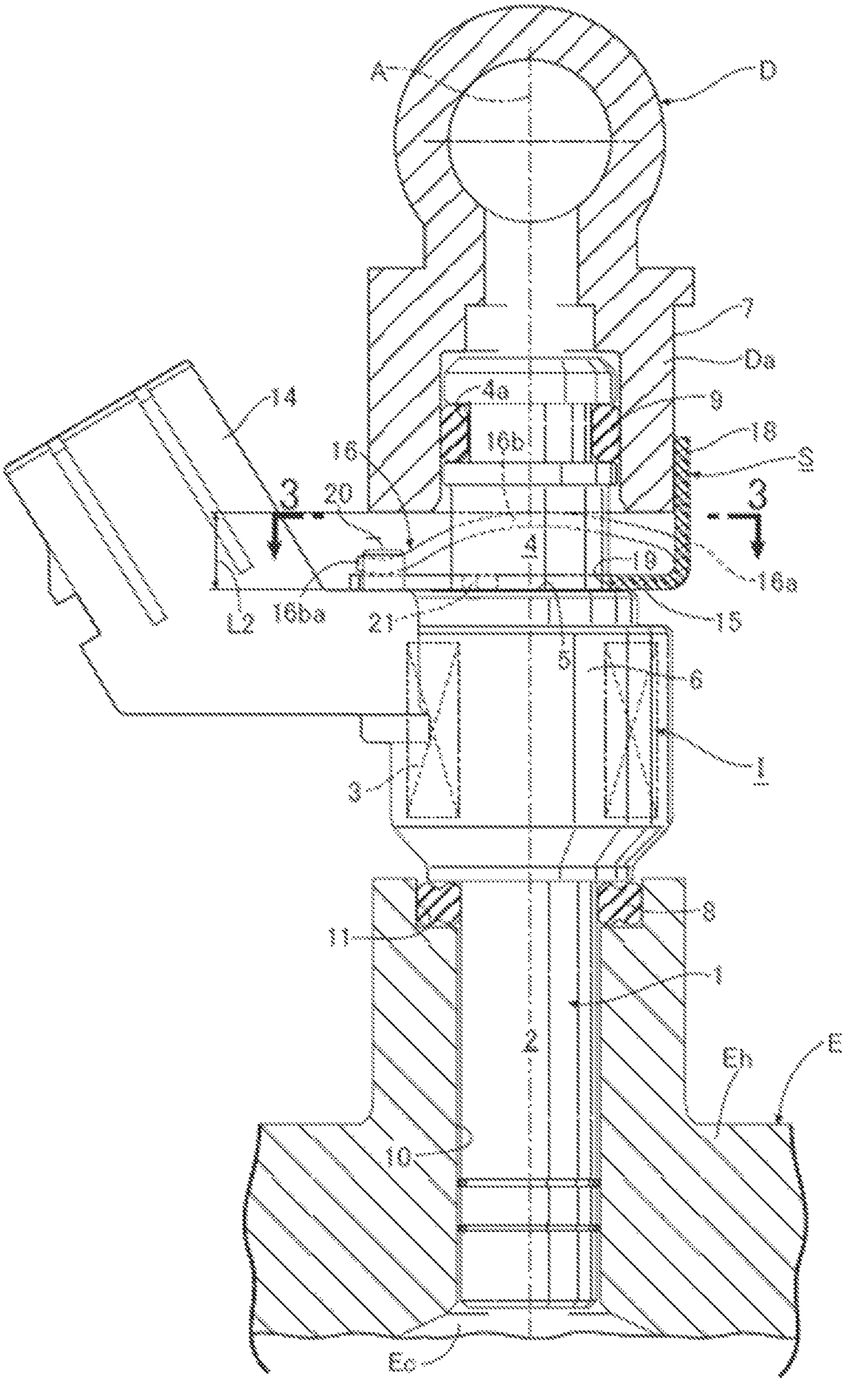
FIG. 2 is an enlarged sectional view taken along line 2-2 of FIG. 1.

First, in FIGS. 1 and 2, a plurality of fuel injection valves I configured to inject fuel into combustion chambers Ec of a plurality of cylinders and a fuel distribution pipe D configured to distribute the fuel to the fuel injection valves I are attached to a cylinder head Eh of a multi-cylinder engine E. In order to hold each fuel injection valve I at a predetermined position, an elastic support structure including an elastic support member S is used. The structure thereof will be described in detail below.

Each fuel injection valve I has a cylindrical valve housing 1 in a center part. A front end part of the valve housing 1 is a fuel nozzle cylinder part 2, a rear end part is a fuel introduction cylinder part 4, and an intermediate part is an electromagnetic coil part 3, and when the electromagnetic coil part 3 is energized, a valve in the fuel nozzle cylinder part 2 is opened, and fuel introduced from the fuel distribution pipe D into the fuel introduction cylinder part 4 is injected into the corresponding combustion chamber Ec.

In addition, the electromagnetic coil part 3 is covered with a synthetic resin molding portion 6, and a coupler 14 for supplying power to the electromagnetic coil part 3 is integrally provided on one side of the synthetic resin molding portion 6 in a protruding manner.

An annular sealing and cushion member 8 that is in close contact with a front end surface of the synthetic resin molding portion 6 is mounted on an outer periphery of the fuel nozzle cylinder part 2. In addition, an O-ring 9 is mounted in a seal groove 4*a* of an outer periphery of the fuel introduction cylinder part 4.

Further, a rear end surface of the synthetic resin molding portion 6 facing a fuel introduction cylinder part 4 side is a flat base surface 5.

Meanwhile, the cylinder head Eh is provided with an injection valve mounting hole 10 of which an inner end is open to a ceiling surface of each combustion chamber Ec and an annular recessed portion 11 that surrounds an outward opening end of the injection valve mounting hole 10, the fuel nozzle cylinder part 2 of the fuel injection valve I is fitted into the injection valve mounting hole 10, and the sealing and cushion member 8 is accommodated in the recessed portion 11.

In addition, the fuel distribution pipe D is disposed along an arrangement direction of the plurality of cylinders of the engine E. and fuel is pressurized from one end side of the fuel distribution pipe D by a fuel pump (not illustrated). A plurality of fuel supply caps Da that are coaxially arranged with the plurality of fuel injection valves I are provided on one side surface of the fuel distribution pipe D in a protruding manner, and these fuel supply caps Da are each fitted onto the outer periphery of the fuel introduction cylinder part 4 of the corresponding fuel injection valve I. In this case, the O-ring 9 is in close contact with an inner peripheral surface of the fuel supply cap Da.

A flat stopper surface 7 parallel to an axis A of the valve housing 1 is formed on an outer side surface of each fuel supply cap Da. A bracket Db is fixedly installed at a base part of each fuel supply cap Da, and the bracket Db is fixed by a bolt 13 to a pillar 12 that is erected on an upper surface of the cylinder head Eh.

Figure 3:
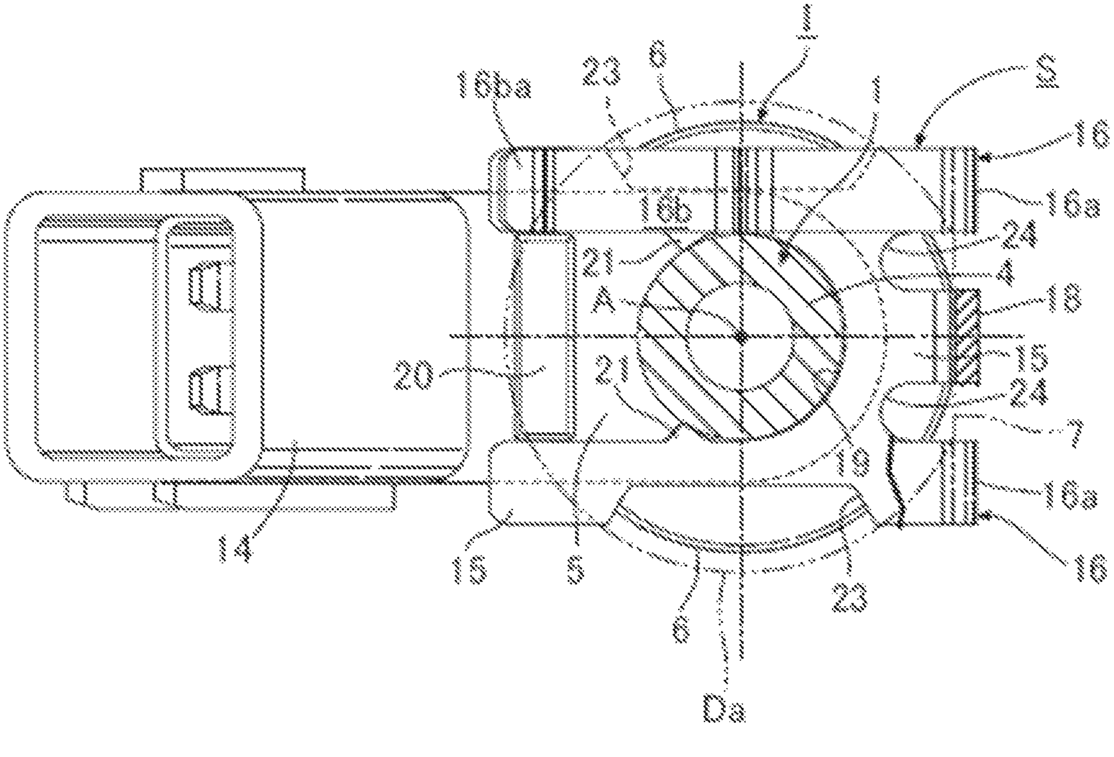
FIG. 3 is a sectional view taken along line 3-3 of FIG. 2.
Figure 4:
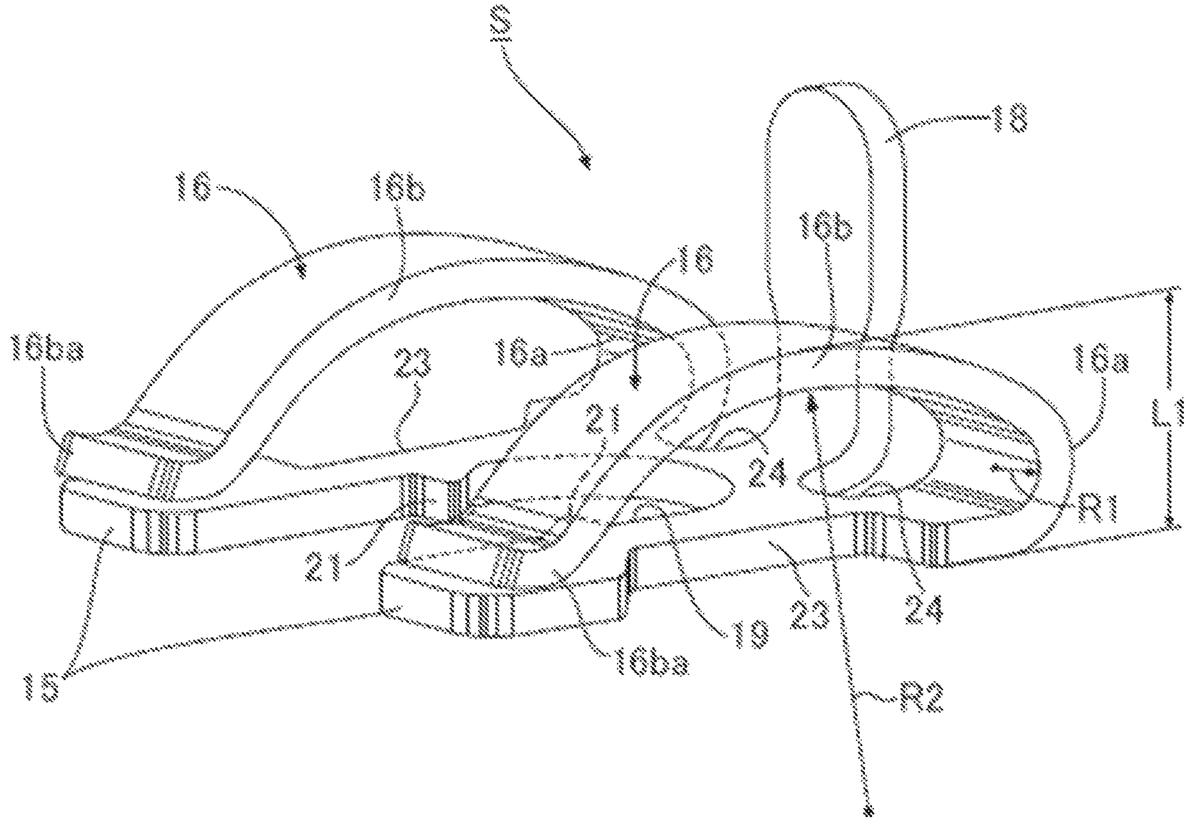
FIG. 4 is a perspective view of each individual elastic support member in each figure.

As illustrated in FIGS. 2 to 4, the elastic support member S is formed by pressing a steel plate and includes a base plate 15, an elastic piece 16, and a positioning piece 18.

The base plate 15 is installed to overlap the base surface 5, and a U-shaped cutout 19 configured to accept the fuel introduction cylinder part 4 is provided in a central part of the base plate 15. The width of the cutout 19 is set to be slightly larger than the outer diameter of the fuel introduction cylinder part 4.

A pair of clastic pieces 16 that elastically come into resilient contact with a front end surface of the fuel supply cap Da are integrally and consecutively provided at one end of the base plate 15 on a side opposite to the above-described cutout 19. The two elastic pieces 16 are disposed with a spacing that allows for the acceptance of the valve housing 1 therebetween.

Each elastic piece 16 includes a first elastic part 16*a* that is bent in a U shape laterally upward from one end of the base plate 15, and a second elastic part 16*b* that extends toward the other end while being curved upward from the first elastic part 16*a* and has a tip part 16*ba* slidably coming into resilient contact with an upper surface of the base plate 15, and a curvature radius R2 of the second elastic part 16*b* is set to be sufficiently larger than a curvature radius R1 of the first elastic part 16*a* (see FIG. 4).

In a free state of the elastic piece 16, a distance L1 (see FIG. 4) from an apex of the second elastic part 16*b* to a lower surface of the base plate 15 is set to be larger than a distance L2 (see FIG. 2) from the base surface 5 to the front end surface of the fuel supply cap Da. Therefore, in a case where the base plate 15 and the elastic pieces 16 are inserted between the base surface 5 and the fuel supply cap Da, the elastic pieces 16 come into resilient contact with the front end surface of the fuel supply cap Da while flexing the first and second elastic parts 16*a* and 16*b*. The tip part 16*ba* of the second elastic part 16*b* can slide on the upper surface of the base plate 15 when flexing the first and second elastic parts 16*a* and 16*b*, and has a shape that curls upward in order to facilitate smooth sliding.

The positioning piece 18 that is vertically erected upward from between the pair of elastic pieces 16 is integrally and consecutively provided at one end of the base plate 15, and the positioning piece 18 is configured to abut on the stopper surface 7 of the fuel supply cap Da.

A pair of snap protrusions 21 that can be snap-engaged with the outer peripheral surface of the fuel introduction cylinder part 4 accepted in the cutout 19 are formed on both inner side surfaces of the base plate 15 facing the U-shaped cutout 19. That is, a spacing between the pair of snap protrusions 21 is set to be narrower than the outer diameter of the fuel introduction cylinder part 4, and during the process of accepting the fuel introduction cylinder part 4 into the cutout 19, the snap protrusions 21 ride over a diameter portion of the fuel introduction cylinder part 4 while flexing the base plate 15 in an opening direction of the cutout 19, and when the snap protrusions 21 have passed through the diameter portion, an elastic restoring force of the base plate 15 closes the cutout 19 to the original position, whereby the snap protrusions 21 are engaged with a rear surface side of the fuel introduction cylinder part 4, and the engagement force thereof prevents the elastic support member S from being detached from the fuel introduction cylinder part 4.

In addition, a pair of first notches 23 are provided in the intermediate parts of both outer side surfaces of the base plate 15. Further, the base plate 15 is provided with a pair of second notches 24 adjacent to the root of the two elastic pieces 16.

In addition, in the synthetic resin molding portion 6, a rotation-preventing protrusion 20 that protrudes from the base surface 5 is integrally formed between the valve housing 1 and the coupler 14, and the rotation-preventing protrusion 20 is engaged with the cutout 19 of the base plate 15 and a space between the tip parts 16*ba* of the pair of elastic pieces 16 coming into resilient contact with the base plate 15 when the elastic support member S is inserted into a predetermined position between the base surface 5 and the fuel supply cap Da.

Next, an operation of the embodiment will be described.

First, when the produced fuel injection valve I is transported to the assembly line of the engine, the elastic support member S is attached to the fuel introduction cylinder part 4 of the fuel injection valve I in advance as follows.

That is, the elastic support member S with the opening part of the U-shaped cutout 19 of the base plate 15 as a leading end is pushed from the outer side of the fuel injection valve I on a side opposite to the coupler 14 in such a way that the fuel introduction cylinder part 4 is accepted into the cutout 19 and between the two elastic pieces 16.

Since the spacing between the pair of snap protrusions 21 on both inner side surfaces of the cutout 19 is set to be narrower than the outer diameter of the fuel introduction cylinder part 4, the snap protrusions 21 ride over the diameter portion of the fuel introduction cylinder part 4 while flexing the base plate 15 in the opening direction of the cutout 19, and when the snap protrusions 21 have passed through the diameter portion, the elastic restoring force of the base plate 15 closes the cutout 19 to the original position, whereby the snap protrusions 21 are snap-engaged with the rear surface side of the fuel introduction cylinder part 4, the engagement force can hold the elastic support member S in the fuel introduction cylinder part 4 and can prevent the elastic support member S from being detached or shifted from the fuel injection valve I during the transportation.

In this way, the adoption of the snap engagement structure for attaching the elastic support member S to the fuel injection valve I can achieve good attachability and simplification of the structure of the elastic support member S.

In addition, at the same time as the above-described snap engagement, the rotation-preventing protrusion 20 of the synthetic resin molding portion 6 is engaged with the cutout 19 of the base plate 15 of the elastic support member S and a space between the pair of elastic pieces 16. Consequently, the fuel injection valve I and the elastic support member S are connected to each other to be non-rotatable around the axis A of the valve housing 1.

In a case where the fuel injection valve I to which the elastic support member S is attached in this way is carried into the assembly line of the engine, the fuel supply cap Da of the fuel distribution pipe D is fitted onto the fuel introduction cylinder part 4 of the fuel injection valve I, and the positioning piece 18 of the elastic support member S abuts on the stopper surface 7 of the fuel supply cap Da. With this abutment, the elastic support member S is non-rotatable with respect to the fuel supply cap Da. In addition, the rotation-preventing protrusion 20 of the synthetic resin molding portion 6 is already engaged with the cutout 19 of the base plate 15 of the elastic support member S and the space between the pair of elastic pieces 16, thereby preventing the fuel injection valve I from rotating around the axis A of the valve housing 1 with respect to the fuel supply cap Da.

Next, the fuel nozzle cylinder part 2 of the above-described fuel injection valve I is inserted into the injection valve mounting hole 10 of the cylinder head Eh, and the sealing and cushion member 8 that is in close contact with the front end surface of the synthetic resin molding portion 6 is accommodated in the recessed portion 11. Then, the bracket Db is fixed to the pillar 12 of the cylinder head Eh by a bolt 13 while compression load is applied to the elastic support member S.

In this case, the pair of elastic pieces 16 resiliently presses the front end surface of the fuel supply cap Da on a plane including the axis A of the valve housing 1 by using the apex of the second elastic part 16*b* while flexing the first and second elastic parts 16*a* and 16*b*. Since the flexural repulsive force of the elastic piece 16 presses the base plate 15 against the base surface 5, the fuel injection valve I is elastically sandwiched between the cylinder head Eh and the fuel supply cap Da via the elastic support member S and the sealing and cushion member 8. Moreover, since the pressing reaction force of the elastic piece 16 with respect to the fuel supply cap Da is applied to the fuel injection valve I along the central axis A, the support of the fuel injection valve I can be stabilized without tilting the fuel injection valve I.

Further, due to the flexural repulsive force of the elastic piece 16, an increase in the contact frictional force of the elastic piece 16 against the base plate 15, that is, an increase in the frictional force between the tip part of the elastic piece 16 and the base plate 15, results in an increase in the opening resistance of the cutout 19 in the base plate 15. This means an increase in the detachment resistance of the snap protrusions 21 from the fuel introduction cylinder part 4, that is, in the snap engagement force. Consequently, it is possible to prevent the elastic support member S from falling off from the fuel injection valve I because of the vibration or the like of the engine E.

In this manner, it is possible to achieve both an appropriate setting of the snap engagement force by the snap protrusion 21 to prioritize the attachability of the elastic support member S to the fuel injection valve I, and an increased snap engagement force in a state in which the fuel injection valve I is mounted on the engine E together with the fuel supply cap Da. Moreover, the adoption of the snap engagement structure eliminates the need to consecutively provide the pair of sandwiching pieces described in Patent Literature 1 on the base plate 15 of the elastic support member S to achieve a simplified structure of the elastic support member S, and cost reduction can be achieved.

Meanwhile, as one method of reducing and adjusting the snap engagement force, the first notch 23 is provided in the intermediate parts of the base plate 15 on both outer sides. With this, the spring constant of the base plate 15 can be reduced and the snap engagement force can be moderately reduced without changing the contact area of the tip part of the elastic piece 16 on the base plate 15 and without changing the height of the snap protrusion 21.

In addition, as another method, the second notch 24 adjacent to the root of the elastic piece 16 is provided on the base plate 15. With this, the snap engagement force can be moderately reduced in the same manner as described above. Further, in a case where both methods are simultaneously adopted, the snap engagement force can be further reduced.

Moreover, the fuel injection valve I mounted on the engine E is prevented via the elastic support member S from rotating around the axis A of the valve housing 1 with respect to the fuel supply cap Da, so that it is possible to stabilize the direction of the injection fuel from the fuel nozzle cylinder part 2.

In addition, since the rotation prevention of the fuel injection valve I with respect to the clastic support member S around the axis A of the valve housing 1 is achieved by engaging the rotation-preventing protrusion 20 of the synthetic resin molding portion 6 with the cutout 19 of the base plate 15 and the space between the pair of elastic pieces 16 originally provided in the clastic support member S, the complication of the elastic support member S can be avoided. Further, since the rotation-preventing protrusion 20 is integrally molded with the coupler 14 on the synthetic resin molding portion 6 that covers the valve housing 1 so as to enclose the electromagnetic coil part 3, it is possible to avoid a cost increase without increasing the number of processing of each member.

In addition, since the rotation-preventing protrusion 20 is disposed between the valve housing 1 and the coupler 14, the elastic support member S is attached from the side opposite to the coupler 14 when the elastic support member S is attached to the fuel injection valve I. Therefore, the elastic support member S can be easily engaged with the rotation-preventing protrusion 20 without interfering with the coupler 14, and good assemblability is obtained.

Further, since each elastic piece 16 includes the first elastic part **16*a* having a small curvature radius R1 and connected to one end part of the base plate 15, and the second elastic part 16*b* having a large curvature radius R2 and extending from the first elastic part 16*a* to cause the tip part 16*ba* to slidably abut on the upper surface of the other end part of the base plate 15, the second elastic part 16*b* is supported on both ends on the base plate 15 via the tip part 16*ba* and the first elastic part 16*a*. Therefore, the elastic force of the second elastic part 16*b* can maintain a biasing function of each elastic piece 16 with respect to the fuel supply cap Da even in a case where plastic deformation occurs in the first elastic part 16*a* (typically, a bent portion having a reduced curvature radius are prone to plastic deformation). Moreover, by setting the curvature radius R2 of the second elastic part 16*b* to be larger than the curvature radius R1 of the first elastic part 16*a*, the height of each elastic piece 16 can be suppressed to be as low as possible, and the elastic support member S can be easily mounted in a narrow space between the base surface 5** and the fuel supply cap Da.

Although the embodiment of the present invention has been described above, the present invention is not limited to the above-described embodiment, and various design changes can be made without departing from the gist of the present invention. For example, the present invention can also be applied to a structure in which the fuel injection valve I is attached to an intake system of the engine.

DESCRIPTION OF REFERENCE NUMERALS

A: axis of valve housing
D: fuel distribution pipe
Da: fuel supply cap
E: engine
I: electromagnetic fuel injection valve
S: elastic support member
2: fuel nozzle cylinder part
3: electromagnetic coil part
4: fuel introduction cylinder part
5: base surface
6: synthetic resin molding portion
10: injection valve mounting hole
14: coupler
15: base plate
16: elastic piece
**16*ba***: tip part of elastic piece
21: snap protrusion
23: first notch
24: second notch

The invention claimed is:

1. A support structure for a fuel injection valve, comprising:

a cylindrical valve housing (1) provided at a center part of a fuel injection valve (I), wherein an electromagnetic coil part (3) is provided at an intermediate part of the valve housing (1), the electromagnetic coil part (3) is covered with a synthetic resin molding portion (6), a coupler (14) configured to supply power to the electromagnetic coil part (3) is integrally provided on one side of the synthetic resin molding portion (6) in a protruding manner, a fuel nozzle cylinder part (2) of the valve housing (1) is fitted into an injection valve mounting hole (10) of an engine (E), a fuel supply cap (Da) of a fuel distribution pipe (D) fixed to the engine (E) is fitted onto a fuel introduction cylinder part (4) of the valve housing (1), an elastic support member(S) configured to bias the valve housing (1) toward the injection valve mounting hole (10) is interposed between the valve housing (1) and the fuel supply cap (Da) to form the support structure, the elastic support member(S) includes a base plate (15) having a U-shaped cutout (19) configured to accept an outer periphery of the fuel introduction cylinder part (4), and overlaid on a flat base surface (5), the base surface (5) facing the fuel supply cap (Da) and provided on a rear end surface of the synthetic resin molding portion (6) facing the fuel introduction cylinder part (4) side, and an elastic piece (16) extending from one end of the base plate (15) on a side opposite to the cutout (19), and configured to bring an intermediate part into resilient contact with the fuel supply cap and bring a tip part into resilient contact with the base plate (15) to apply an axial elastic force to the cylindrical valve housing (1), the synthetic resin molding portion (6) has a rotation-preventing protrusion (20) provided between the coupler (14) and the fuel introduction cylinder part (4) and protruding from a transition portion spanning as an extending plane extending from the base surface (5), the elastic support member(S) has a structure in which a pair of snap protrusions (21) snap-engaged with an outer peripheral surface of the fuel introduction cylinder part (4) accepted in the cutout (19) are each formed on both inner side surfaces of the cutout (19) of the base plate (15), and the rotation-preventing protrusion (20) is engaged with the cutout (19) and a space between tip parts (16*ba*) of a pair of the elastic pieces (16) simultaneously with the snap engagement, each of the elastic pieces (16) includes a first elastic part (16*a*) that is bent in a U shape laterally upward from one end of the base plate (15), and a second elastic part 16*b*) that extends toward the other end while being curved upward from the first elastic part (16*a*) and has a tip part (16*ba*) slidably coming into resilient contact with an upper surface of the base plate (15), and a curvature radius (R2) of the second elastic part (16*b*) is set to be sufficiently larger than a curvature radius (R1) of the first elastic part (16*a*), and a snap engagement force of the snap protrusion (21) with respect to the fuel introduction cylinder part (4) increases because of an increase in a contact frictional force of the elastic piece (16) against the base plate (15) caused by an increase in a flexural repulsive force of the elastic piece (16), in a mounted state of the fuel injection valve (I) on the engine (E).

2. The support structure for a fuel injection valve according to claim 1, wherein a first notch (23) is provided in intermediate parts of both outer side surfaces of the base plate (15).

3. The support structure for a fuel injection valve according to claim 1, wherein a second notch (24) adjacent to a root of the elastic piece (16) is provided in the base plate (15).

4. The support structure for a fuel injection valve according to claim 2, wherein a second notch (24) adjacent to a root of the elastic piece (16) is provided in the base plate (15).

* * * * *